United States Patent
Wang et al.

(10) Patent No.: US 9,898,649 B2
(45) Date of Patent: Feb. 20, 2018

(54) FACE AUTHENTICATION METHOD AND DEVICE

(71) Applicant: BEIJING TECHSHINO TECHNOLOGY CO., LTD., Beijing (CN)

(72) Inventors: Ning Wang, Beijing (CN); Xiangde Zhang, Beijing (CN); Wuming Jiang, Beijing (CN); Yaoluo Zhang, Beijing (CN)

(73) Assignee: BEIJING TECHSHINO TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/107,067

(22) PCT Filed: Oct. 17, 2014

(86) PCT No.: PCT/CN2014/088867
§ 371 (c)(1),
(2) Date: Jun. 21, 2016

(87) PCT Pub. No.: WO2015/101080
PCT Pub. Date: Jul. 9, 2015

(65) Prior Publication Data
US 2017/0039418 A1  Feb. 9, 2017

(30) Foreign Application Priority Data

Dec. 31, 2013  (CN) .......................... 2013 1 0752853

(51) Int. Cl.
*G06K 9/00*  (2006.01)
*G06N 99/00*  (2010.01)

(52) U.S. Cl.
CPC ..... *G06K 9/00288* (2013.01); *G06K 9/00281* (2013.01); *G06N 99/005* (2013.01)

(58) Field of Classification Search
CPC .......... G06K 9/00288; G06K 9/00281; G06K 9/4671; G06K 9/00832; G06N 99/005
See application file for complete search history.

(56) References Cited

U.S. PATENT DOCUMENTS

2016/0217319 A1* 7/2016 Bhanu ................ G06K 9/00288

FOREIGN PATENT DOCUMENTS

| CN | 101404060 A | 4/2009 |
| CN | 103136516 A | 6/2013 |

(Continued)

OTHER PUBLICATIONS

Gunther et al: "The 2013 Face Recognition Evaluation in Mobile Environment", IEEE, Jun. 7, 2013.*

(Continued)

*Primary Examiner* — Ruiping Li
(74) *Attorney, Agent, or Firm* — Dorsey & Whitney LLP

(57) ABSTRACT

The disclosure discloses a face authentication method and device. The face authentication method includes: acquiring multiple face training images; extracting Gabor features of the multiple face training images; extracting Pattern of Oriented Edge Magnitude (POEM) features of the multiple face training images; fusing the Gabor features of the multiple face training image and the POEM features of the multiple face training image to acquire positive samples and negative samples of the multiple face training images; training the positive samples and negative samples of the multiple face training images to obtain training results by an AdaBoost algorithm; and performing face authentication by the training results. By the disclosure, the problem of difficulty of a face authentication method in the related technology in combination of efficiency and recognition rate is solved, and the effects of improving feature extraction (Continued)

efficiency of face recognition and increasing the face recognition rate are further achieved.

10 Claims, 7 Drawing Sheets

(56) References Cited

FOREIGN PATENT DOCUMENTS

| CN | 103268485 A | 8/2013 |
|---|---|---|
| CN | 103353936 A | 10/2013 |
| CN | 103679158 A | 3/2014 |

OTHER PUBLICATIONS

Zhang et al: "Boosting Local Feature Based Classifiers for Face Recognition", IEEE, 2004.*
Vu et al: "Face recognition using the POEM descriptor", Pattern Recognition, 2012.*

* cited by examiner

FACE AUTHENTICATION METHOD AND DEVICE

CROSS REFERENCE TO RELATED APPLICATIONS

This application is a national stage application under 35 U.S.C. § 371 of International Application No. PCT/CN2014/088867, filed 17 Oct. 2014, entitled "Face authentication method and device," which claims priority to Chinese Patent Application No. 201310752853.6 filed 31 Dec. 2013.

TECHNICAL FIELD

The disclosure relates to the field of image processing, and in particular to a face authentication method and device.

BACKGROUND

Along with development of an information technology, an information security problem becomes increasingly serious, wherein personal identification is an important part in the field of information security.

Face authentication is a face recognition form, judges whether two given face images belong to the same person or not by extracting characteristics of the two given face images, and has the characteristics of directness, friendliness and convenience compared with another biological feature authentication technology.

Face authentication mainly includes three parts, i.e. face detection, eye location and feature extraction and authentication.

A face belongs to a typical three-dimensional non-rigid object, and face authentication is usually based on a view pattern, and is easily influenced by an uncertain factor such as light, a posture and an expression, so that face recognition is extremely challenging. In addition, face recognition relates to multiple fields of computer science, pattern recognition, artificial intelligence and the like, has broad application market and huge commercial potential, and thus has drawn attention of more and more companies and research institutes.

A face authentication solution in a related technology will be introduced below.

Early face recognition algorithms all take parameters such as distances and ratios of face feature points as features and suppose that an image background is undiversified or there is no background. In the last few decades, researches on face recognition have made a great progress, domestic and abroad researchers proposed some methods about face recognition, and although different researchers may summarize and classify existing face recognition algorithms from different points, the face recognition algorithms are feature extraction methods, and forms of features are closely related to classification rules. In the disclosure, face recognition methods are substantially divided into: a geometric-feature-based method, an algebraic-feature-based method and a texture-feature-based method.

(1) The Geometric-feature-based Method

According to the method, a face is represented by a geometric feature vector, the geometric feature vector is a feature vector based on shapes and geometric relationships of face organs, and its components usually include a Euclidean distance between two points of the face, a curvature, an angle and the like. Main algorithms include an integral projection method, elastic template matching and the like. The method utilizes positions of different feature points of eyes, nose, mouth and the like of the face, and position information of these points is difficult to obtain, and is greatly influenced by expressions and light.

(2) The Algebraic-feature-based Method

According to the method, an overall attribute of a face pattern is considered, for example, a Principal Component Analysis (PCA) method and a Linear Discriminant Analysis (LDA) method.

The PCA method performs PCA on face images which is taken as vectors, reduces the face images to a certain dimension to obtain feature vectors, and balances a similarity between two face images by a cosine value of an included angle between the two vectors.

A basic thought of the LDA method is to seek for a projection space to maximize a ratio of an inter-sample class discrete degree and an intra-sample class discrete degree after projection, so that a subspace formed by LDA aims to achieve optimal divisibility, and is more suitable than PCA for recognition.

The biggest problem of these methods is a singularity problem of a matrix, and moreover, overall information of a face is utilized, and is easily influenced by expressions, light and the like.

(3) The Texture-feature-based Method

The method extracts texture information on a face, and converts a face recognition problem into texture classification, and common extracted texture features include a Local Binary Pattern (LBP) feature, a Gabor feature and a Pattern of Oriented Edge Magnitude (POEM) feature.

The three feature extraction manners may all extract global information of a face image without influence of an occlusion. However, LBP features are poor in light stability particularly when light non-uniformly changes. Gabor features are less influenced by light, but extraction of the Gabor features of each point on the whole face is low in speed. Compared with LBP feature extraction, POEM feature extraction calculates a gradient map at first, and an LBP operator is applied on such a basis, so that influence of light is also reduced; POEM features are extracted and calculated according to blocks, so that a speed is higher; and however, it is necessary to design positions and sizes of the feature blocks. In brief, Gabor features are extracted by points on the face image, while POEM features are extracted by blocks on the face image.

Defects of the Related Technology

1: Expressiveness of a face which is a complex and changing non-rigid object and influence of a change in an outside condition in an image acquisition process make face authentication difficult, and an ideal effect is unlikely to be achieved by adoption of only one face feature for face authentication.

2: Complexity of a face pattern requires low time complexity of an authentication algorithm. When Gabor features are used, thousands of Gabor feature points are required for storage, and a calculation burden is very heavy, so that it is unfavorable for large-scale face database recognition and authentication. A Gabor-feature-based face authentication method requires extraction of a large number of Gabor feature points and requires a large amount of complex calculation, so that an extraction speed is low. In addition, Gabor feature points extracted by the method include many highly-related feature points, which may cause low discriminability during face authentication.

3: Adoption of POEM feature exampling also has such a limit that division of image blocks is fixed. Since a face is greatly influenced by an environment and a posture, extraction of more and more effective features from the face may not be ensured if positions and sizes of feature blocks are fixed.

The method is lower in calculation burden during extraction of POEM feature blocks, so that its feature point extraction speed is high. However, positions and sizes of the POEM feature blocks are usually required to be fixed in the related technology, and the POEM feature blocks with the fixed positions and sizes may not be the most ideal feature blocks. In addition, the POEM feature blocks extracted by the method include many highly-related feature blocks, which may cause low discriminability during face authentication.

For the problem of difficulty of a face authentication method in the related technology in combination of efficiency and recognition rate, there is yet no effective solution.

SUMMARY

A main purpose of the disclosure is to provide a face authentication method, to solve the problem of difficulty of a face authentication method in the related technology in combination of efficiency and recognition rate.

In order to achieve the purpose, according to one aspect of the disclosure, a face authentication method is provided, which includes: acquiring multiple face training images; extracting Gabor features of the multiple face training images; extracting POEM features of the multiple face training images; fusing the Gabor features of the multiple face training image and the POEM features of the multiple face training image to acquire positive samples and negative samples of the multiple face training images, wherein the positive samples are pairwise combinations of different face images of the same person in the multiple face training images, and the negative samples are pairwise combinations of face images of different persons in the multiple face training images; training the positive samples and negative samples of the multiple face training images to obtain training results by an AdaBoost algorithm; and performing face authentication by the training results.

In order to achieve the purpose, according to the other aspect of the disclosure, a face authentication device is provided, which includes: an acquisition unit, configured to acquire multiple face training images; a first extraction unit, configured to extract Gabor features of the multiple face training images; a second extraction unit, configured to extract POEM features of the multiple face training images; a fusing unit, configured to fuse the Gabor features of the multiple face training image and the POEM features of the multiple face training image to acquire positive samples and negative samples of the multiple face training images, wherein the positive samples are pairwise combinations of different face images of the same person in the multiple face training images, and the negative samples are pairwise combinations of face images of different persons in the multiple face training images; a training unit, configured to train the positive samples and negative samples of the multiple face training images to obtain training results by an AdaBoost algorithm; and an authentication unit, configured to perform face authentication by the training results.

By the disclosure, the problem of difficulty of a face authentication method in the related technology in combination of efficiency and recognition rate is solved, and the effects of improving feature extraction efficiency of face recognition and increasing the face recognition rate are further achieved.

BRIEF DESCRIPTION OF THE DRAWINGS

The drawings forming a part of the disclosure are adopted to provide further understanding of the disclosure, and schematic embodiments of the disclosure and description thereof are adopted to explain the disclosure and not intended to form improper limits to the disclosure. In the drawings.

DETAILED DESCRIPTION OF THE EMBODIMENTS

It is important to note that embodiments in the disclosure and characteristics in the embodiments may be combined under the condition of no conflicts. The disclosure will be described below with reference to the drawings and the embodiments in detail.

In order to make those skilled in the art better understand the solutions of the disclosure, the technical solutions in the embodiments of the disclosure will be clearly and completely described below with reference to the drawings in the embodiments of the disclosure, and obviously, the described embodiments are not all embodiments but only a part of embodiments of the disclosure. All of other embodiments obtained on the basis of the embodiments of the disclosure by those skilled in the art without creative work shall fall within the scope of protection of the disclosure.

The disclosure provides a face authentication method. The face authentication method may perform face authentication on the basis of Gabor features and POEM features, and the face authentication method will be described below with reference to the drawings.

Figure 1:
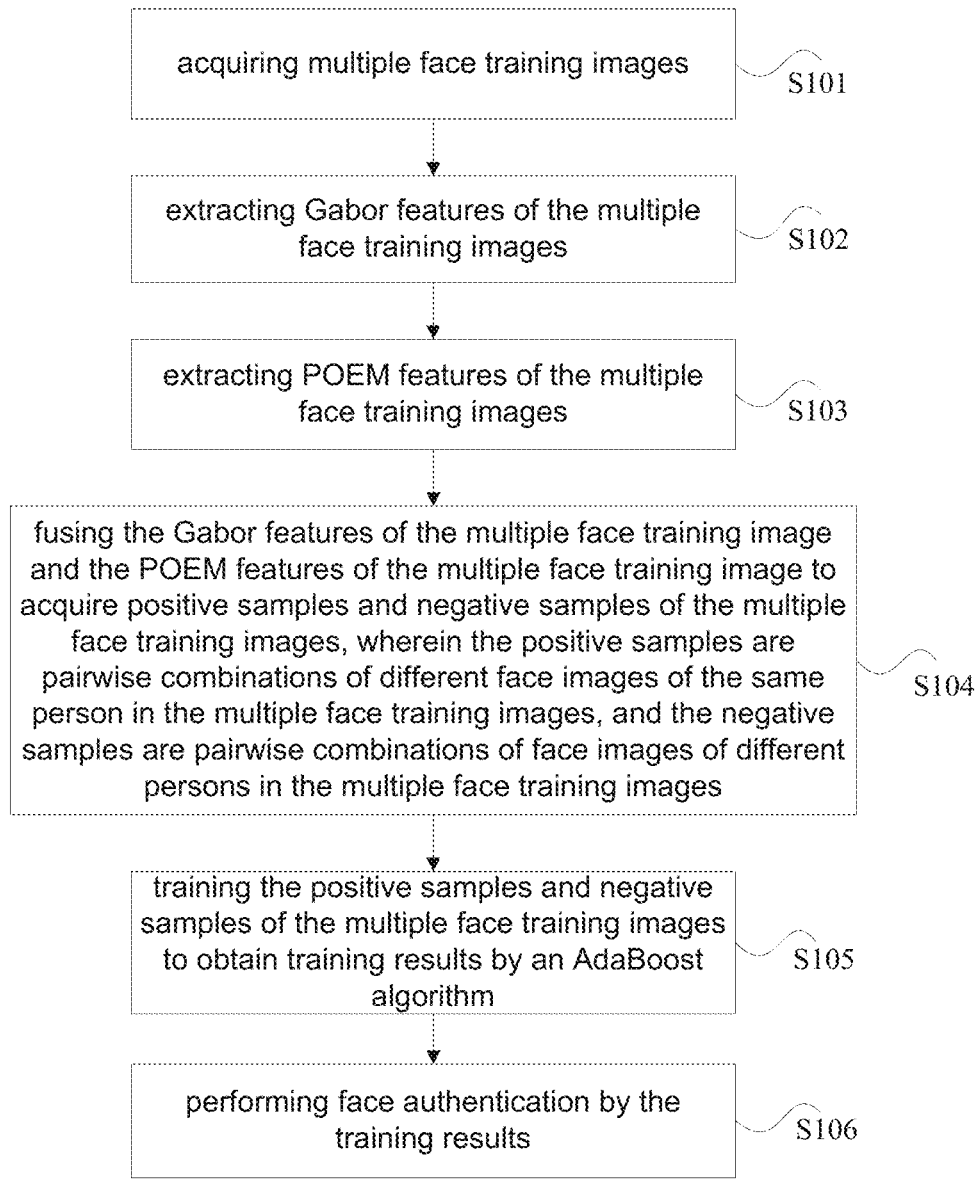
FIG. 1 is a flowchart of a face authentication method according to a first embodiment of the disclosure.

FIG. 1 is a flowchart of a face authentication method according to a first embodiment of the disclosure. As shown in FIG. 1, the face authentication method includes the following steps.

Step 101: acquiring multiple face training images.

Step 102: extracting Gabor features of the multiple face training images.

The Gabor features may be extracted by a Gabor filter. Specifically, a 5-dimension 8-direction filter may be utilized for extraction, and an expression of the filter is as follows:

$$\psi_{v,\mu} = \frac{\|\vec{k}\|^2}{\sigma^2}\exp\left(-\frac{\|\vec{k}\|^2\|\vec{r}\|^2}{2\sigma^2}\right)\exp(i\vec{k}\cdot\vec{r}) \text{ where}$$

-continued $$\vec{r} = \begin{pmatrix} x \\ y \end{pmatrix}, \vec{k} = \left(\frac{\pi}{2f^v}\right)\begin{pmatrix} \cos\mu\pi/8 \\ \sin\mu\pi/8 \end{pmatrix}, v = 0, 1, 2, 3, 4 \text{ and}$$

$$\mu = 0, 1, \ldots 7,$$

where v is dimension, μ is direction, σ=2π, f=√2, grid charts with different grid node distances are generated for 5 different dimensions respectively, and for each grid node under each dimension, an 8×1 vector is generated to represent feature information of the grid node according to 8 Gabor filtering directions μ=0, 1, . . . , 7.

FIG. 2 is a diagram of Gabor feature points of images in different dimensions according to an embodiment of the disclosure. For a 251×203 face image, totally 4,384 grid features are generated in 5 dimensions by taking a wavelength of $\lambda_{0,\ldots,4}=\{4,4\sqrt{2},8,8\sqrt{2},16\}$ of the Gabor filter as a distance between every two grid nodes respectively. FIG. 2a to FIG. 2e show grid features generated according to different wavelengths of the Gabor filter respectively, and along with increase of the wavelength of the Gabor filter, fewer features are extracted. A calculation expression for the kth feature (x,y) is as follows:

$$C_{\mu,k} = \text{Magnitude}(I(x,y) * \psi_{v,\mu})$$

where I(x,y) represents a (x,y)-centered area on an original face image, and a size of I(x,y) corresponds to a size of a window of the filter. Magnitude(z) is a magnitude of a calculation complex z, v is a dimension corresponding to the image with the point, μ=0, 1, . . . , 7, and then a feature vector corresponding to the feature is $$C_k = [C_{0,k}, C_{1,k}, C_{2,k}, C_{3,k}, C_{4,k}, C_{5,k}, C_{6,k}, C_{7,k}],$$

where elements in [ ] may be called "components", and are normalized to obtain a Gabor feature $C=[C_1^T, C_2^T, \ldots, C_{4384}^T]^T$ of the whole image.

Extraction of local texture features of an image may be implemented by Gabor feature extraction, and belongs to windowed Fourier transform, a Gabor function has high spatial locality and direction selectivity, and features of the image may be extracted in different dimensions and different directions on the frequency domain, so that spatial frequency and local structure features in multiple directions of a local area of the image may be obtained.

Step 103: extracting POEM features of the multiple face training images.

Figure 3A:
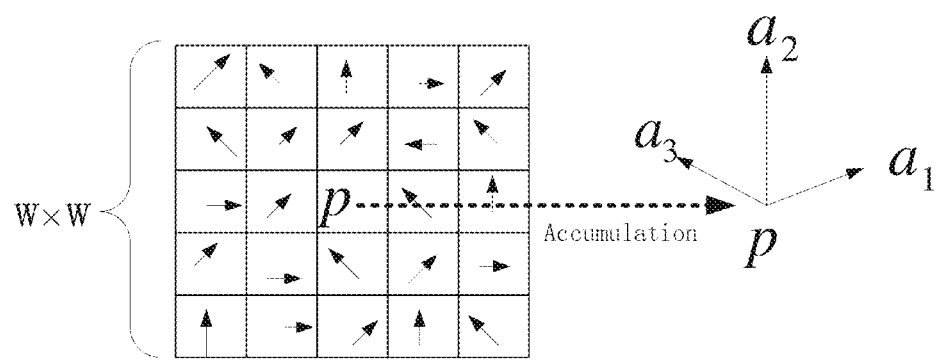
FIG. 3A to FIG. 3B are diagrams of POEM feature generation according to an embodiment of the disclosure.
Figure 3B:
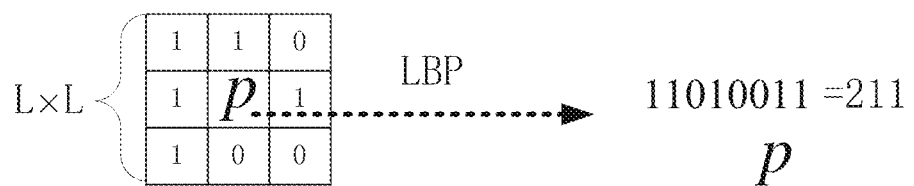

In order to facilitate description below and understanding to the implementation solution of the disclosure, the following definitions are introduced:

cell: as shown in FIG. 3a, a cell is a pixel block with a size of w×w, its central pixel is p, and values of pixel points in the pixel are accumulated to p, wherein a1, a2 and a3 in FIG. 3a are gradients in three different directions respectively; and block: as shown in FIG. 3b, a block is an image block where adjacent pixels which are selected during LBP calculation, and if a size of the block is L×L, a radius of an LBP operator is L/2, 9 pixels shown in FIG. 3b are in the same image block, and a size of the image block is L×L.

Wherein, an LBP clockwise compares any pixel in an image with 8 adjacent pixels around, marks 1 at the adjacent pixels if a grayscale value of the pixel is smaller than those of the adjacent pixels, otherwise marks 0, and thus obtains an 8-digit binary number after comparison with all of the 8 adjacent pixels around, a decimal number corresponding to the binary number being a code of the pixel.

In the embodiment, values of all pixel points in an area of each cell are accumulated to the central pixel.

Figure 4:
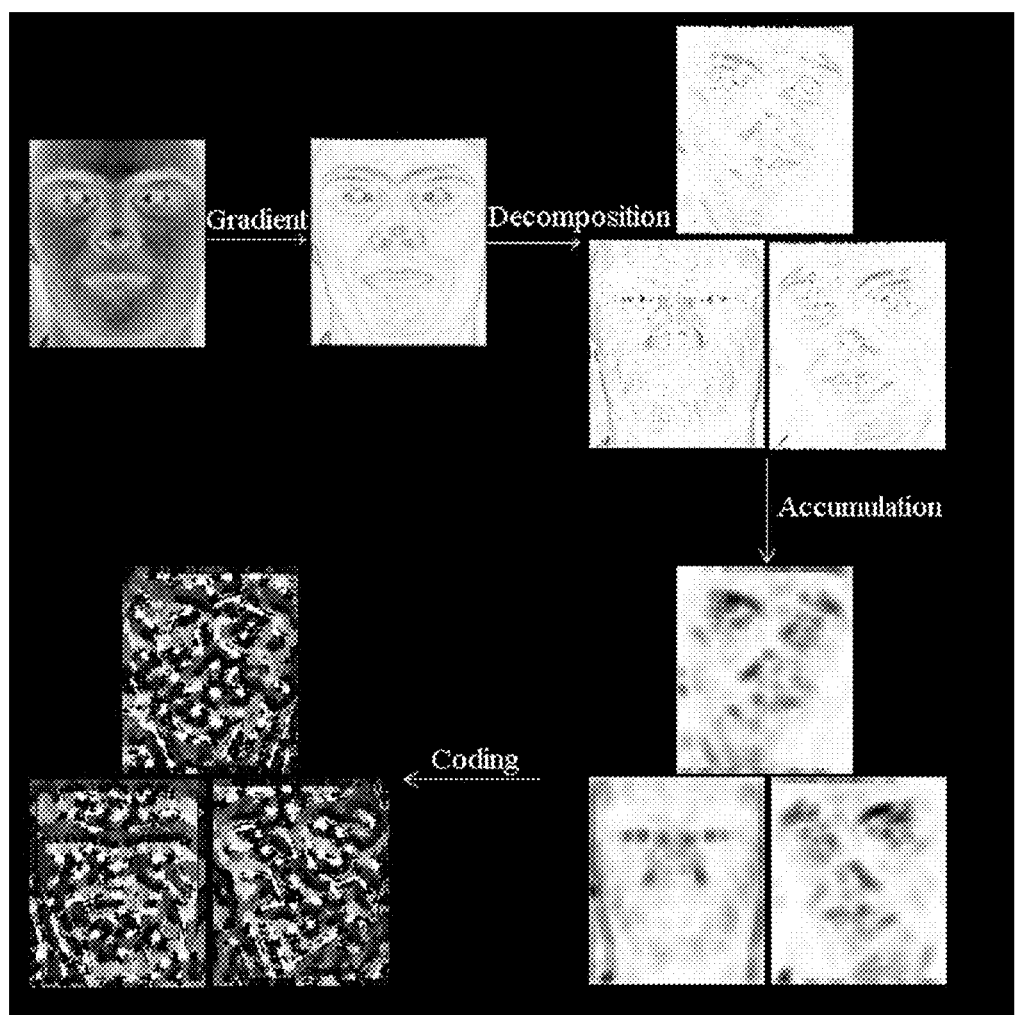
FIG. 4 is a flowchart of POEM feature extraction according to an embodiment of the disclosure.

FIG. 4 shows a flow of extracting the POEM features of the multiple face training images, gradients of the face images shown in FIG. 4 are calculated to obtain face images of which the gradients are calculated, the face images of which the gradients are calculated are divided into three face images in three gradient directions according to the gradient directions, each decomposed face image is accumulated to obtain accumulated face images, LBP coding is performed on the accumulated face images to obtain coded face images, and a specific method is as follows.

First, gradient graphs of the face training images are calculated, and a gradient direction of each pixel point is mapped into an integer of 1 to T. For example, if a gradient direction of a certain pixel point falls in interval $$\left[(t-1)\frac{\pi}{T}, t\frac{\pi}{T}\right],$$

t is adopted to represent the gradient direction. Then, each pixel point may be represented by a two-dimensional vector (m,t), where m is a magnitude of a gradient and t is a discretized gradient direction.

A gradient of pixel point (x,y) is calculated, and according to gradient direction t (wherein 1 represents 0°-60°, 2 represents 60°-120° and 3 represents 120°-180°), a gradient magnitude in the direction is determined.

Second, a histogram of a gradient graph in a cell is calculated, and the obtained histogram of the gradient graph is accumulated to a central pixel of the cell. In such a manner, vectors $(a_1, a_2, \ldots a_i \ldots, a_T)$ are obtained for each pixel point, wherein $a_i$ is the sum of gradient magnitudes of gradients of all the pixel points of the cell where the corresponding pixel point is located in the ith interval. Then, decomposition is performed to obtain T sub-graphs, a grayscale value of the pixel points of the ith sub-graph is $a_i$, and the graph is an accumulated gradient graph of direction i.

Figure 8:
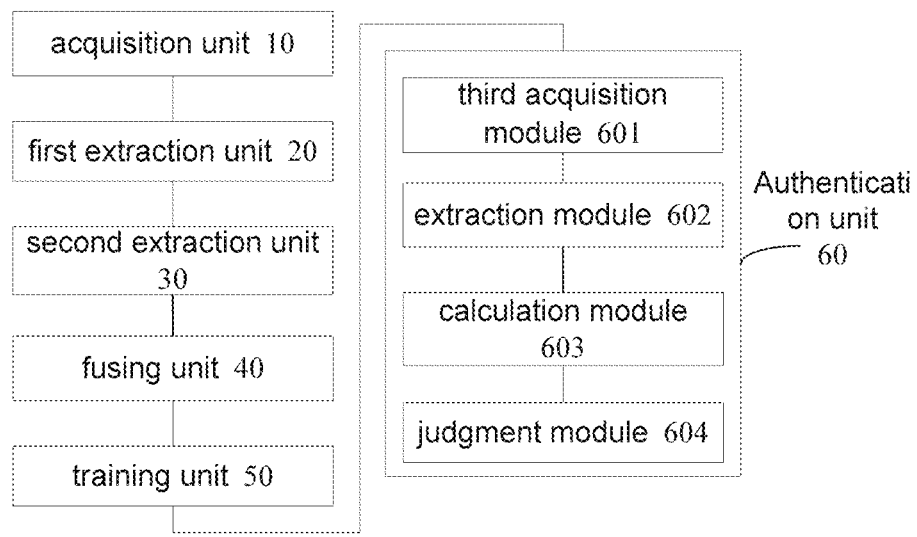
FIG. 8 is a diagram of a face authentication device according to a preferred embodiment of the disclosure.

Finally, an LBP operator is calculated on each accumulated gradient graph, and for example, on the ith accumulated gradient graph, a POEM code of pixel p is calculated as follows:

$$POEM_{L,w,n}^i(p) = \sum_{j=0}^{n-1} f(s(m_p^i, m_{c_j}^i))2^j,$$

where $m_p^i$ and $m_{c_j}^i$ are accumulated gradient magnitudes of pixel p and the jth adjacent pixel in the ith accumulated gradient graph respectively, s(.,.) is a similarity function, and may be defined as a difference between two gradient values, L and w are side lengths of a block and a cell respectively, n is the number of the pixels compared with the central pixel during LBP coding, the number n of the pixels compared with the central pixel is, as shown in FIGS. 3b, 8, and f is a function defined as follows:

$$f(x) = \begin{cases} 1 & x \geq 0 \\ 0 & x < 0 \end{cases}.$$

The LBP operator, as shown in FIG. 3b, clockwise compares any pixel in an image block with 8 adjacent pixels around, marks 1 at the adjacent pixels if a grayscale value of the pixel is smaller than those of the adjacent pixels, otherwise marks 0, and thus obtains an 8-digit binary number 11010011 of which a corresponding decimal number 211 is a code of the pixel.

Codes of each pixel are calculated according to the abovementioned pixel code calculation method, and the coded face images are traversed to finally obtain the POEM features according to rectangles of different sizes and different positions.

For example, in a traversing process, if a size of a rectangle is 30×20 pixels, a downward hopping step length is 6 pixels and a rightward hopping step length is 4 pixels, a point in the left upper corner of a first block is [1,1], a point in the left upper corner of a second block is [7,1], and so on.

Step 104: fusing the Gabor features of the multiple face training images and the POEM features of the multiple face training images to acquire positive samples and negative samples of the multiple face training images, wherein the positive samples are pairwise combinations of different face images of the same person in the multiple face training images, and the negative samples are pairwise combinations of face images of different persons in the multiple face training images.

The pairwise combinations of different face images of the same person in the multiple face training images are taken as the positive samples, the pairwise combinations of the face images of different persons in the multiple face training images are taken as the negative samples, and in such a combination manner, high-similarity features of the same persons and low-similarity features of different persons may be obtained by an AdaBoost algorithm, and accuracy and stability of the algorithm are improved.

Step 105: training the positive samples and negative samples of the multiple face training images to obtain training results by the AdaBoost algorithm.

The positive samples and the negative samples are trained by the AdaBoost algorithm, and in a training process, not only the Gabor features or the POEM features are considered, but the Gabor features and the POEM features are fused, the training results are comprehensively calculated by the AdaBoost algorithm, and the obtained training results may be taken as models for judging whether every two face images belong to the faces of the same persons or not.

Step 106: performing face authentication by the training results.

The features of the multiple face training images are trained to obtain the training results, the training results may be taken as the models for judging whether every two face images belong to the faces of the same persons or not, and the models are utilized to judge whether every two faces belong to the same persons or not, thereby authenticating the faces.

In the face authentication method of the embodiment of the disclosure, the Gabor features and POEM features of the multiple face images are extracted, the Gabor features and the POEM features are fused to obtain the training results of the positive samples and the negative samples, and the training results may be utilized to judge whether every two face images belong to the same persons or not, thereby achieving the effect of face recognition.

In addition, a method for fusing and training the Gabor features and the POEM features utilizes the advantage of high light stability of the Gabor features and the POEM features, reduces the number of the features obtained by training for face authentication, improves feature extraction efficiency and solves the problem of lower recognition rate during face recognition with an undiversified feature, thereby solving the problem of difficulty of the face authentication method in the related technology in combination of efficiency and recognition rate and further achieving the effects of improving feature extraction efficiency of face recognition and increasing the face recognition rate.

Furthermore, fusing the Gabor features of the multiple face training images and the POEM features of the multiple face training images to acquire the positive samples and negative samples of the multiple face training images includes:

for the Gabor features of the multiple face training images, calculating inner products of feature vectors of the Gabor features corresponding to every two face training images in the multiple face training images to obtain first vectors.

For example, a Gabor feature vector of image A is $C^A$, a Gabor feature vector of image B is $C^B$, and then an inner product of the feature vectors of image A and image B is calculated to obtain first vectors as follows:

$$S^1(C^A,C^B)=[C_1^A \cdot C_1^B, C_2^A \cdot C_2^B, \ldots, C_{4384}^A \cdot C_{4384}^B].$$

For the POEM features of the multiple face training images, Chi-Square distances of histograms of the POEM features corresponding to every two face training images in the multiple face training images are calculated to obtain second vectors.

For example, $C'^A$ is adopted to represent a POEM feature of face training image A, $C'^B$ is adopted to represent a POEM feature of face training image B, and then the Chi-Square distances of every two POEM features in the multiple face training images are calculated to obtain the second vectors as follows:

$$S^2(C'^A,C'^B)=[d(C_1'^A,C_1'^B),d(C_2'^A,C_2'^B),\ldots,d(C_k'^A,C_k'^B)],$$

where $d(C_1,C_2)$ represents a Chi-Square distance of histogram $C_1$ corresponding to the POEM feature of training image A and histogram $C_2$ of the POEM feature of training image B.

The first vectors and the second vectors are combined to obtain the positive samples and negative samples of the multiple face training images.

After multiple first vectors and multiple second vectors are obtained, all training samples $[(S_1,y_1),(S_2,y_2),\ldots,(S_N,y_N)]$ are obtained by taking the vectors generated by every two different images of the same persons as the positive samples and taking the vectors generated by every two different images of the same persons as the negative samples, $S_i=(S_i^1,S_i^2)$, y=1 representing a positive sample and y=0 representing a negative sample.

The Gabor features and the POEM features are fused by taking the vectors generated by every two different images of the same persons as the positive samples and taking the vectors generated by every two images of different persons as the negative samples, and feature screening is performed to obtain face features with higher positive and negative sample distinction degrees after the Gabor features and the POEM features are fused. Fusing the Gabor features and the POEM features improves face recognition accuracy, simultaneously reduces feature extraction and improves face authentication efficiency.

Figure 2A:
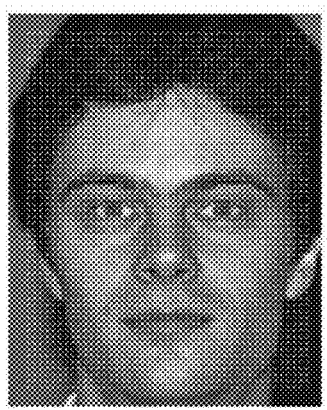
FIG. 2A to FIG. 2E are diagrams of Gabor feature points of images in different dimensions according to an embodiment of the disclosure.
Figure 2B:
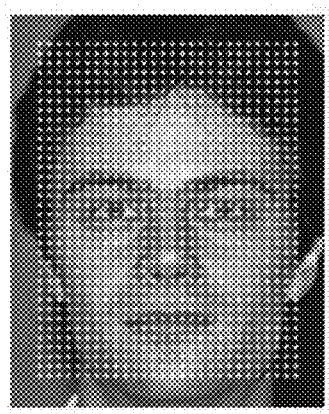
Figure 2C:
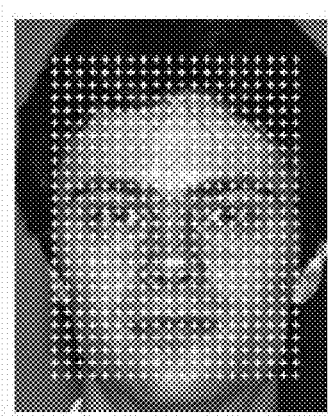
Figure 2D:
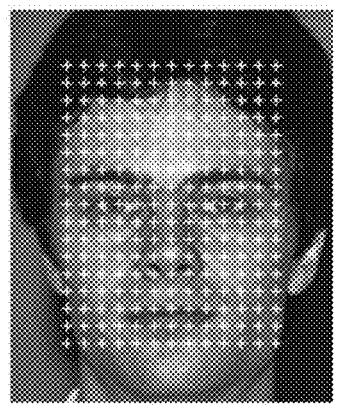
Figure 2E:
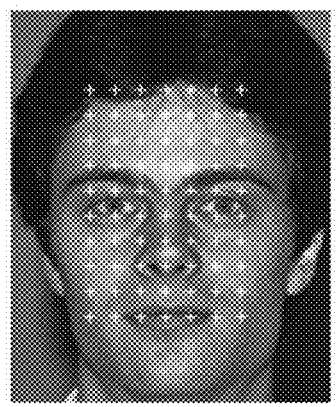
Figure 5A:
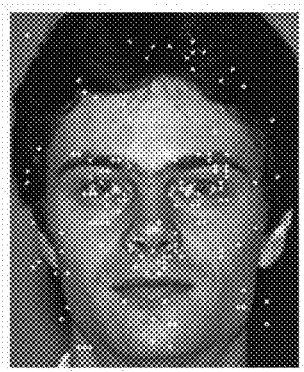
FIG. 5A to FIG. 5E are distribution graphs of selected Gabor features according to an embodiment of the disclosure.
Figure 5B:
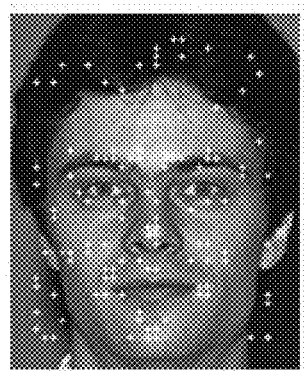
Figure 5C:
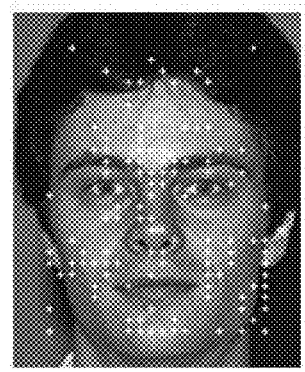
Figure 5D:
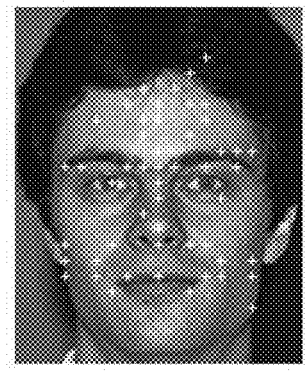
Figure 5E:
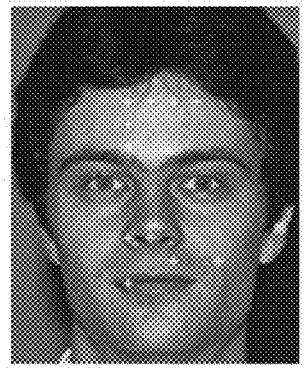

The screened Gabor features are shown in FIG. 5, and FIG. 5 shows screened Gabor features in different dimensions, wherein the dimension of FIG. 5a is the same as the dimension of FIG. 2a, the Gabor features in FIG. 2a are screened to obtain the Gabor features in FIG. 5a, and similarly, FIG. 5b, FIG. 5c, FIG. 5d and FIG. 5e correspond to FIG. 2b, FIG. 2c, FIG. 2d and FIG. 2e one by one respectively.

Furthermore, training the positive samples and negative samples of the multiple face training images by the AdaBoost algorithm includes: acquiring training targets of the AdaBoost algorithm, the training targets including the recognition rate and/or the false recognition rate, and training the positive samples and negative samples of the multiple face training images by the training targets until the training targets are achieved.

The training targets of the AdaBoost algorithm include the recognition rate and/or the false recognition rate, and the recognition rate and the false recognition rate may be preset according to face authentication accuracy. For example, it is set that the recognition rate of the AdaBoost algorithm of each level is a=0.998 and the false recognition rate is b=0.5. The same positive samples are adopted for each level, the negative samples of the Nth level are the mistakenly authenticated samples of the (N−1)th level, and the same number of samples are adopted for each level. Training is performed in each level according to the following method.

The samples such as $(x_1,y_1), \ldots, (x_n,y_n)$ are trained, wherein $y_i=0,1$ represent a positive sample and a negative sample respectively and n is the number of the trained samples.

Weights of the samples are initialized, the weight of the ith negative sample is $$w_{0,i} = \frac{1}{2m}, i = 1, 2, \ldots, m,$$

and the weight of the ith positive sample is $$w_{0,i} = \frac{1}{2l}, i = m+1, m+2, \ldots, m+l,$$

where m and l are the number of the negative samples and the number of the positive samples respectively.

$t=1, \ldots T$, where t represents the number of iteration times in the training process.

First, the weights are normalized, $$w_{t,i} = \frac{w_{t,i}}{\sum_{j=1}^{n} w_{t,j}}.$$

Then, for each feature j, a weak classifier $h_j$ is trained, and a weight error rate $\epsilon_j = \sum_i w_{t,i} |h_j(x_i) - y_i|$ is calculated.

Next, the classifier with the lowest weight error rate is selected as $h_t$.

Later on, the weights of the samples are updated: $w_{t+1,i} = w_{t,i} \beta_t^{1-e_i}$.

Wherein, if sample $x_i$ is correctly classified, $e_i=0$, otherwise $e_i=1$, and $$\beta_t = \frac{\epsilon_t}{1-\epsilon_t},$$

where $\epsilon_t$ is the smallest in all $\epsilon_j$.

Finally, a threshold theta capable of making the false recognition rate right less than or equal to 0.5 is selected, the current recognition rate is compared whether to be more than 0.998 or not, training is stopped if YES, otherwise training is continued.

A finally obtained strong classifier is:

$$h(x) = \begin{cases} 1 & \sum_{t=1}^{T} \alpha_t h_t(x) \geq \text{theta} \\ 0 & \text{otherwise} \end{cases}, \text{ where } \alpha_t = \log \frac{1}{\beta_t}.$$

By the abovementioned training process, it is expected to screen the Gabor features and the POEM features to make the recognition rate and/or false recognition rate of face authentication with the screened Gabor features and POEM features achieve the training targets, thereby obtaining a more accurate result about whether face image A and face image B belong to the same face or not.

Furthermore, training the positive samples and negative samples of the multiple face training images to obtain the training results by the AdaBoost algorithm includes:

a face classifier is formed by training of the AdaBoost algorithm, the face classifier including multiple levels of strong classifiers and weak classifiers forming each level of strong classifier in the multiple levels of strong classifiers, the weak classifiers consisting of the Gabor features and the POEM features, the weak classifiers including type parameters, position parameters, dimension parameters and direction parameters of the features, as well as threshold parameters and weight parameters which are determined according to a set goal of the face recognition rate, and the threshold parameters being configured to determine the face authentication results.

Figure 6:
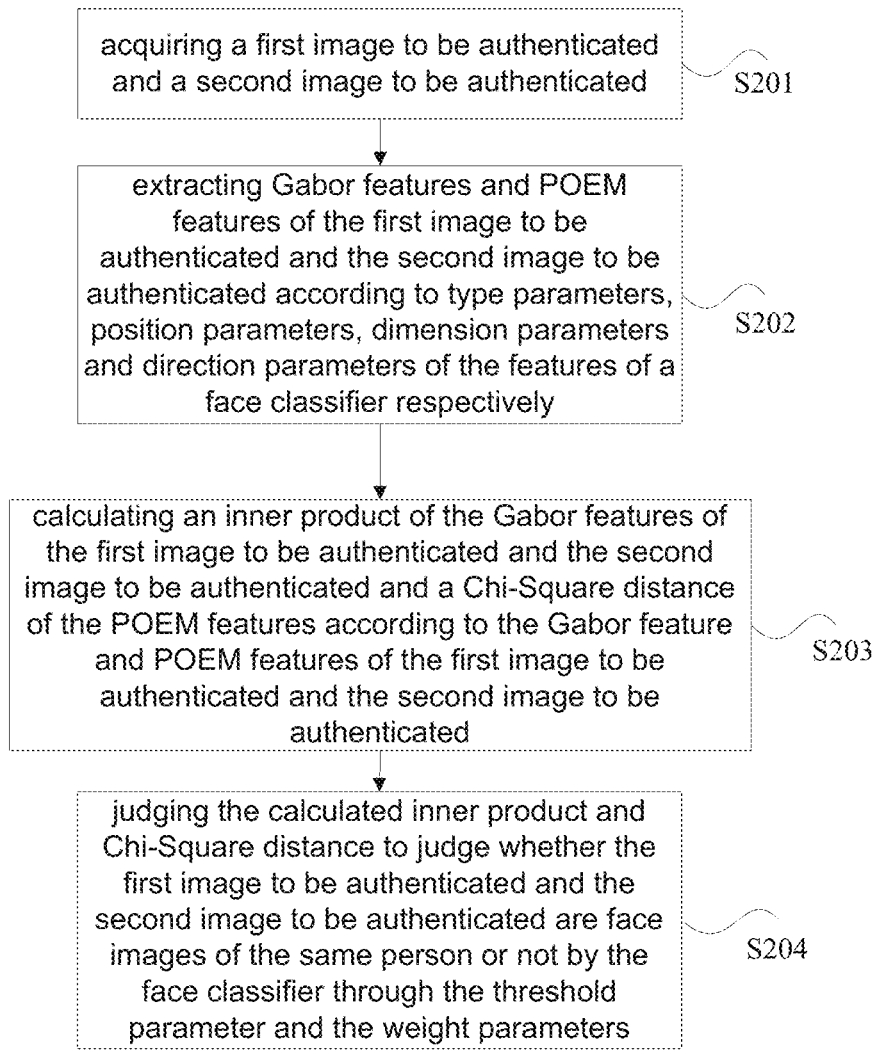
FIG. 6 is a flowchart of a face authentication method according to an embodiment of the disclosure.

As shown in FIG. 6, a method for performing face authentication by the face classifier includes the following steps:

Step 201: acquiring a first image to be authenticated and a second image to be authenticated.

The first image to be authenticated and the second image to be authenticated are required to be judged whether to be two face images of the same face or not.

Step 202: extracting Gabor features and POEM features of the first image to be authenticated and the second image to be authenticated according to the type parameters, position parameters, dimension parameters and direction parameters of the features of the face classifier respectively.

The Gabor feature and POEM feature of the first image to be authenticated are extracted, the Gabor feature and POEM feature of the second image to be authenticated are extracted, and the feature extraction method has been introduced in the abovementioned embodiment of the disclosure in detail, and will not be elaborated herein.

Step 203: calculating an inner product of the Gabor features of the first image to be authenticated and the second image to be authenticated and a Chi-Square distance of the POEM features according to the Gabor feature and POEM features of the first image to be authenticated and the second image to be authenticated.

For example, a Gabor feature vector of the first image to be authenticated is $C^A$, a Gabor feature vector of the second image to be authenticated is $C^B$, the inner product of the Gabor feature vectors of the first image to be authenticated and the second image to be authenticated is calculated, and a calculation method is as follows:

$$Sim(C^A, C^B) = \sum_{i=1}^{8} C_i^A * C_i^B.$$

A calculation method for calculating the Chi-Square distance of the histograms of the POEM features of the first image to be authenticated and the second image to be authenticated is as follows:

$$Dis(p_1, p_2) = \sum_i \frac{(p_1^i - p_2^i)^2}{p_1^i + p_2^i},$$

where Dis represents the Chi-Square distance of the two histograms $p_1$ and $p_2$.

Step 204: judging the calculated inner product and Chi-Square distance to judge whether the first image to be authenticated and the second image to be authenticated are face images of the same person or not by the face classifier through the threshold parameter and the weight parameters.

For judging whether the first image to be authenticated and the second image to be authenticated are the face images of the same person or not, it is necessary to cascade the weak classifiers and the strong classifiers.

The cascaded classifiers include multiple strong classifiers, each level of strong classifier includes multiple weak classifiers, $h_t$ represents a weak classifier, then a first vector which is the inner product of the two Gabor feature vectors and a second vector which is the Chi-Square distance of the histograms of the two POEM features are compared with a threshold parameter of the corresponding weak classifier $h_t$, it is determined that the first and second vectors pass verification of the weak classifier if a requirement of the threshold parameter is met, a verification result is 1, and if the first and second vectors do not pass verification of the weak classifier, the verification result is 0.

Similarly, a judgment method for the second vector is the same as that for the first vector, and will not be elaborated herein.

Under the strong classifier of a certain level, the weights are accumulated according to judgment results of threshold parameters of the weak classifiers, the weights of the weak classifiers are accumulated if verification of the weak classifiers succeeds, otherwise the weights are not accumulated.

After judgment and weight accumulation of the weak classifiers, the accumulated weights are compared with the threshold parameters of the strong classifiers to which the weak classifiers belong, and similarly, if accumulated weight values are more than the threshold parameters of the strong classifiers, it is determined that verification of the strong classifiers succeeds, and if the accumulated weight values are smaller than the threshold parameters of the strong classifiers, it is determined that verification of the strong classifiers fail.

After verification of the strong classifiers of the previous levels succeeds, the strong classifiers of the next levels perform judgment until verification of all the strong classifiers succeeds, and if verification of all the strong classifiers succeeds, it is determined that the first image to be authenticated and the second image to be authenticated are the face images of the same person.

According to the disclosure, the Gabor features and POEM features of the training images are screened by the cascading AdaBoost algorithm, robustness of the Gabor features to light is utilized, and feature extraction and authentication speed may also be greatly increased.

From the above, it can be seen that the disclosure achieves the following technical effects:

1: the Gabor features and POEM features are extracted from the multiple face training images, for the Gabor features, the Gabor features are determined at different distances on the face images according to different dimensions, and for the POEM features, blocks at different positions and with different sizes are traversed on the face images, and the selected POEM features enrich a structuring manners of the POEM features; the Gabor features and the POEM features are trained by the AdaBoost algorithm, and during authentication, only the selected features are extracted; and 2: the two kinds of features are simultaneously selected by the AdaBoost algorithm, and low-correlation features are selected, so that the number of the selected features is greatly reduced, and feature extraction speed is increased.

In addition, when face recognition is performed on a Feret database according to the features obtained by fusing the two kinds of features, the false recognition rate on fa, fb and dup1 is 0.001, and the recognition rates are 0.971, 0.985 and 0.751 respectively; when the false recognition rate of face recognition only with the Gabor features is 0.001, the recognition rates are 0.962, 0.969 and 0.698 respectively; and when the false recognition rate of face recognition only with the POEM features is 0.001, the recognition rates are 0.967, 0.974 and 0.719 respectively. Therefore, the recognition rate of face recognition with the two kinds of features which are fused is higher than the recognition rate of face recognition with any one of the two kinds of features.

The embodiment of the disclosure further provides a face authentication device.

Figure 7:
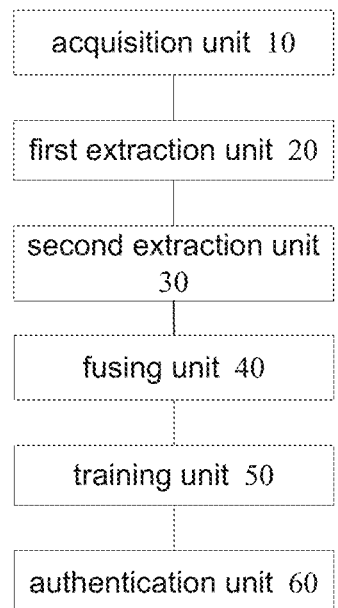
FIG. 7 is a diagram of a face authentication device according to an embodiment of the disclosure.

FIG. 7 is a diagram of a face authentication device according to an embodiment of the disclosure. As shown in FIG. 7, the face authentication device includes an acquisition unit 10, a first extraction unit 20, a second extraction unit 30, a fusing unit 40, a training unit 50 and an authentication unit 60.

The acquisition unit 10 is configured to acquire multiple face training images.

The first extraction unit 20 is configured to extract Gabor features of the multiple face training images.

The Gabor features may be extracted by a Gabor filter. Specifically, a 5-dimension 8-direction filter may be utilized for extraction, and an expression of the filter is as follows:

$$\psi_{v,\mu} = \frac{\|\vec{k}\|^2}{\sigma^2} \exp\left(-\frac{\|\vec{k}\|^2 \|\vec{r}\|^2}{2\sigma^2}\right) \exp(i\vec{k}\cdot\vec{r}) \text{ where } \vec{r} = \begin{pmatrix} x \\ y \end{pmatrix},$$

$$\vec{k} = \left(\frac{\pi}{2f^v}\right)\begin{pmatrix} \cos\mu\pi/8 \\ \sin\mu\pi/8 \end{pmatrix}, v = 0, 1, 2, 3, 4 \text{ and } \mu = 0, 1, \ldots, 7,$$

where v is dimension, μ is direction, σ=2π, f=√2, grid charts with different grid node distances are generated for 5 different dimensions respectively, and for each grid node under each dimension, an 8×1 vector is generated to represent feature information of the grid node according to 8 Gabor filtering directions μ=0, 1, . . . , 7.

FIG. 2 shows a diagram of Gabor feature points of images in different dimensions. For a 251×203 face image, totally 4,384 grid features are generated in 5 dimensions by taking a wavelength $\lambda_{0,\ldots,4}$={4,4√2,8,8√2,16} of the Gabor filter as a distance between every two grid nodes respectively.

FIG. 2a to FIG. 2e show grid features generated according to different wavelengths of the Gabor filter respectively, and along with increase of the wavelength of the Gabor filter, fewer features are extracted. A calculation expression for the kth feature (x,y) is as follows:

$$C_{\mu,k} = \text{Magnitude}(I(x,y) * \psi_{v,\mu})$$

where I(x,y) represents a (x,y)-centered area on an original face image, and a size of I(x,y) corresponds to a size of a window of the filter. Magnitude(z) is a magnitude of a calculation complex z, v is a dimension corresponding to the image with the point, $\mu = 0, 1, \ldots, 7$, and then a feature vector corresponding to the feature is $$C_k = [C_{0,k}, C_{1,k}, C_{2,k}, C_{3,k}, C_{4,k}, C_{5,k}, C_{6,k}, C_{7,k}],$$

where elements in [ ] may be called "components", and are normalized to obtain a Gabor feature $C = [C_1^T, C_2^T, \ldots, C_{4384}^T]^T$ of the whole image.

Extraction of local texture features of an image may be implemented by Gabor feature extraction, and belongs to windowed Fourier transform, a Gabor function has high spatial locality and direction selectivity, and features of the image may be extracted in different dimensions and different directions on the frequency domain, so that spatial frequency and local structure features in multiple directions of a local area of the image may be obtained.

The second extraction unit 30 is configured to extract POEM features of the multiple face training images.

In order to facilitate description below and understanding to the implementation solution of the disclosure, the following definitions are introduced:

cell: as shown in FIG. 3a, a cell is a pixel block with a size of w×w, its central pixel is p, and values of pixel points in the pixel are accumulated to p, wherein a1, a2 and a3 in FIG. 3a are gradients in three different directions respectively; and block: as shown in FIG. 3b, a block is an image block where adjacent pixels which are selected during LBP calculation, and if a size of the block is L×L, a radius of an LBP operator is L/2, 9 pixels shown in FIG. 3b are in the same image block, and a size of the image block is L×L.

Wherein, an LBP clockwise compares any pixel in an image with 8 adjacent pixels around, marks 1 at the adjacent pixels if a grayscale value of the pixel is smaller than those of the adjacent pixels, otherwise marks 0, and thus obtains an 8-digit binary number after comparison with all of the 8 adjacent pixels around, a decimal number corresponding to the binary number being a code of the pixel.

In the embodiment, values of all pixel points in an area of each cell are accumulated to the central pixel.

FIG. 4 shows a flow of extracting the POEM features of the multiple face training images, gradients of the face images shown in FIG. 4 are calculated to obtain face images of which the gradients are calculated, the face images of which the gradients are calculated are divided into three face images in three gradient directions according to the gradient directions, each decomposed face image is accumulated to obtain accumulated face images, LBP coding is performed on the accumulated face images to obtain coded face images, and a specific method is as follows.

First, gradient graphs of the face training images are calculated, and a gradient direction of each pixel point is mapped into an integer of 1 to T. For example, if a gradient direction of a certain pixel point falls in interval $$\left[ (t-1)\frac{\pi}{T}, t\frac{\pi}{T} \right],$$

t is adopted to represent the gradient direction. Then, each pixel point may be represented by a two-dimensional vector (m,t), where m is a magnitude of a gradient and t is a discretized gradient direction.

A gradient of pixel point (x,y) is calculated, and according to gradient direction t (wherein 1 represents 0°-60°, 2 represents 60°-120° and 3 represents 120°-180°), a gradient magnitude in the direction is determined.

Second, a histogram of a gradient graph in a cell is calculated, and the obtained histogram of the gradient graph is accumulated to a central pixel of the cell. In such a manner, vectors $(a_1, a_2, \ldots a_i, \ldots, a_T)$ are obtained for each pixel point, wherein $a_i$ is the sum of gradient magnitudes of gradients of all the pixel points of the cell where the corresponding pixel point is located in the ith interval. Then, decomposition is performed to obtain T sub-graphs, a grayscale value of the pixel points of the ith sub-graph is $a_i$, and the graph is an accumulated gradient graph of direction i.

Finally, an LBP operator is calculated on each accumulated gradient graph, and for example, on the ith accumulated gradient graph, a POEM code of pixel p is calculated as follows:

$$\text{POEM}_{L,w,n}^i(p) = \sum_{j=0}^{n-1} f\left(s(m_p^i, m_{c_j}^i)\right) 2^j,$$

where $m_p^i$ and $m_{c_j}^i$ are accumulated gradient magnitudes of pixel p and the jth adjacent pixel in the ith accumulated gradient graph respectively, s(.,.) is a similarity function, and may be defined as a difference between two gradient values, L and w are side lengths of a block and a cell respectively, n is the number of the pixels compared with the central pixel during LBP coding, the number n of the pixels compared with the central pixel is, as shown in FIGS. 3b, 8, and f is a function defined as follows:

$$f(x) = \begin{cases} 1 & x \geq 0 \\ 0 & x < 0 \end{cases}.$$

The LBP operator, as shown in FIG. 3b, clockwise compares any pixel in an image block with 8 adjacent pixels around, marks 1 at the adjacent pixels if a grayscale value of the pixel is smaller than those of the adjacent pixels, otherwise marks 0, and thus obtains an 8-digit binary number 11010011 of which a corresponding decimal number 211 is a code of the pixel.

Codes of each pixel are calculated according to the abovementioned pixel code calculation method, and the coded face images are traversed to finally obtain the POEM features according to rectangles of different sizes and different positions.

For example, in a traversing process, if a size of a rectangle is 30×20 pixels, a downward hopping step length is 6 pixels and a rightward hopping step length is 4 pixels, a point in the left upper corner of a first block is [1,1], a point in the left upper corner of a second block is [7,1], and so on.

Wherein, the second extraction unit 30 is configured to extract the POEM features of the multiple face training images, and the extraction unit 30 includes a coding module, a first acquisition module, a traversing module and a feature module, wherein the coding module is configured to perform POEM code calculation on the multiple face training images; the first acquisition module is configured to acquire multiple rectangles of different sizes and different positions; the traversing module is configured to traverse each face in the multiple face training images subjected to POEM code calculation to obtain histograms of POEM codes in the rectangles according to the multiple rectangles; and the feature module is configured to determine the histograms as the POEM features.

The using unit 40 is configured to fuse the Gabor features of the multiple face training images and the POEM features of the multiple face training images to acquire positive samples and negative samples of the multiple face training images, wherein the positive samples are pairwise combinations of different face images of the same person in the multiple face training images, and the negative samples are pairwise combinations of face images of different persons in the multiple face training images.

The pairwise combinations of different face images of the same person in the multiple face training images are taken as the positive samples, the pairwise combinations of the face images of different persons in the multiple face training images are taken as the negative samples, and in such a combination manner, high-similarity features of the same persons and low-similarity features of different persons may be obtained by an AdaBoost algorithm, and accuracy and stability of the algorithm are improved.

The training unit 50 is configured to train the positive samples and negative samples of the multiple face training images to obtain training results by the AdaBoost algorithm.

The positive samples and the negative samples are trained by the AdaBoost algorithm, and in a training process, not only the Gabor features or the POEM features are considered, but the Gabor features and the POEM features are fused, the training results are comprehensively calculated by the AdaBoost algorithm, and the obtained training results may be taken as models for judging whether every two face images belong to the faces of the same persons or not.

The authentication unit 60 is configured to perform face authentication by the training results.

The features of the multiple face training images are trained to obtain the training results, the training results may be taken as the models for judging whether every two face images belong to the faces of the same persons or not, and the models are utilized to judge whether every two faces belong to the same persons or not, thereby authenticating the faces.

In the face authentication device of the embodiment of the disclosure, the Gabor features and POEM features of the multiple face images are extracted, the Gabor features and the POEM features are fused to obtain the training results of the positive samples and the negative samples, and the training results may be utilized to judge whether every two face images belong to the same persons or not, thereby achieving the effect of face recognition.

In addition, fusing and training the Gabor features and the POEM features through the fusing unit 40 utilizes the advantage of high light stability of the Gabor features and the POEM features, reduces the number of the features obtained by training for face authentication, improves feature extraction efficiency and solves the problem of lower recognition rate during face recognition with an undiversified feature, thereby solving the problem of difficulty of the face authentication method in the related technology in combination of efficiency and recognition rate and further achieving the effects of improving feature extraction efficiency of face recognition and increasing the face recognition rate.

Furthermore, the fusing unit 40 is configured to fuse the Gabor features of the multiple face training images and the POEM features of the multiple face training images to acquire the positive samples and negative samples of the multiple face training images through the following modules:

a first vector module, configured to, for the Gabor features of the multiple face training images, calculate inner products of feature vectors of the Gabor features corresponding to every two face training images in the multiple face training images to obtain first vectors.

For example, a Gabor feature vector of image A is $C^A$, a Gabor feature vector of image B is $C^B$, and then an inner product of the feature vectors of image A and image B is calculated to obtain first vectors as follows:

$$S^1(C^A, C^B) = [C_1^A \cdot C_1^B, C_2^A \cdot C_2^B, \ldots, C_{4384}^A \cdot C_{4384}^B].$$

A second vector module, configured to, for the POEM features of the multiple face training images, calculate Chi-Square distances of histograms of the POEM features corresponding to every two face training images in the multiple face training images to obtain second vectors.

For example, $C'^A$ is adopted to represent a POEM feature of face training image A, $C'^B$ is adopted to represent a POEM feature of face training image B, and then the Chi-Square distances of every two POEM features in the multiple face training images are calculated to obtain the second vectors as follows:

$$S^2(C'^A, C'^B) = [d(C_1'^A, C_1'^B), d(C_2'^A, C_2'^B), \ldots, d(C_k'^A, C_k'^B)],$$

where $d(C_1, C_2)$ represents a Chi-Square distance of histogram $C_1$ corresponding to the POEM feature of training image A and histogram $C_2$ of the POEM feature of training image B.

A sample module, configured to combine the first vectors and the second vectors are combined to obtain the positive samples and negative samples of the multiple face training images.

After multiple first vectors and multiple second vectors are obtained, all training samples $[(S_1, y_1), (S_2, y_2), \ldots, (S_N, y_N)]$ are obtained by taking the vectors generated by every two different images of the same persons as the positive samples and taking the vectors generated by every two different images of the same persons as the negative samples, where $S_i = (S_i^1, S_i^2)$, $y=1$ representing a positive sample and $y=0$ representing a negative sample.

The Gabor features and the POEM features are fused by taking the vectors generated by every two different images of the same persons as the positive samples and taking the vectors generated by every two images of different persons as the negative samples, and feature screening is performed to obtain face features with higher positive and negative sample distinction degrees after the Gabor features and the POEM features are fused. Fusing the Gabor features and the POEM features improves face recognition accuracy, simultaneously reduces feature extraction and improves face authentication efficiency.

The screened Gabor features are shown in FIG. 5, and FIG. 5 shows screened Gabor features in different dimensions, wherein the dimension of FIG. 5*a* is the same as the dimension of FIG. 2*a*, the Gabor features in FIG. 2*a* are screened to obtain the Gabor features in FIG. 5*a*, and similarly, FIG. 5b, FIG. 5c, FIG. 5d and FIG. 5e correspond to FIG. 2b, FIG. 2c, FIG. 2d and FIG. 2e one by one respectively.

Furthermore, the training unit includes a second acquisition module and a training module.

The second acquisition module is configured to acquire training targets of the AdaBoost algorithm, the training targets including the recognition rate and/or the false recognition rate.

The training module is configured to train the positive samples and negative samples of the multiple face training images by the training targets until the training targets are achieved.

The training targets of the AdaBoost algorithm include the recognition rate and/or the false recognition rate, and the recognition rate and the false recognition rate may be preset according to face authentication accuracy. For example, it is set that the recognition rate of the AdaBoost algorithm of each level is a=0.998 and the false recognition rate is b=0.5. The same positive samples are adopted for each level, the negative samples of the Nth level are the mistakenly authenticated samples of the (N−1)th level, and the same number of samples are adopted for each level. Training is performed in each level according to the following method.

the samples such as $(x_1,y_1), \ldots, (x_n,y_n)$ are trained, wherein $y_i=0,1$ represent a positive sample and a negative sample respectively and n is the number of the trained samples.

Weights of the samples are initialized, the weight of the ith negative sample is $$w_{0,i} = \frac{1}{2m}, i = 1, 2, \ldots, m,$$

and the weight of the ith positive sample is $$w_{0,i} = \frac{1}{2l}, i = m+1, m+2, \ldots, m+l,$$

where m and l are the number of the negative samples and the number of the positive samples respectively.

t=1, . . . T, t representing the number of iteration times in the training process.

First, the weights are normalized, $$w_{t,i} = \frac{w_{t,i}}{\sum_{j=1}^{n} w_{t,j}}.$$

Then, for each feature j, a weak classifier $h_j$ is trained, and a weight error rate $\epsilon_j \Sigma_i w_{t,i} |h_j(x_i)-y_i|$ is calculated.

Next, the classifier with the lowest weight error rate is selected as $h_t$.

Later on, the weights of the samples are updated: $w_{t+1,i} = w_{t,i} \beta_t^{1-e_i}$.

Wherein, if sample $x_i$ is correctly classified, $e_i=0$, otherwise $e_i=1$, and $$\beta_t = \frac{\epsilon_t}{1-\epsilon_t},$$

where $\epsilon_t$ is the smallest in all $\epsilon_j$.

Finally, a threshold theta capable of making the false recognition rate right less than or equal to 0.5 is selected, the current recognition rate is compared whether to be more than 0.998 or not, training is stopped if YES, otherwise training is continued.

A finally obtained strong classifier is:

$$h(x) = \begin{cases} 1 & \sum_{t=1}^{T} \alpha_t h_t(x) \geq \text{theta} \\ 0 & \text{otherwise} \end{cases}, \text{ where } \alpha_t = \log\frac{1}{\beta_t}.$$

By the abovementioned training process, it is expected to screen the Gabor features and the POEM features to make the recognition rate and/or false recognition rate of face authentication with the screened Gabor features and POEM features achieve the training targets, thereby obtaining a more accurate result about whether face image A and face image B belong to the same face or not.

Furthermore, the training unit includes: a forming module, configured to form a face classifier by training of the AdaBoost algorithm, the face classifier including multiple levels of strong classifiers and weak classifiers forming each level of strong classifier in the multiple levels of strong classifiers, the weak classifiers consisting of the Gabor features and the POEM features, the weak classifiers including type parameters, position parameters, dimension parameters and direction parameters of the features, as well as threshold parameters and weight parameters which are determined according to a set goal of the face recognition rate, and the threshold parameters being configured to determine the face authentication results.

The authentication unit 60 is configured to perform face authentication by the face classifier, and the authentication unit includes a third acquisition module 601, extraction module 602, calculation module 603 and judgment module 604 shown in FIG. 8.

The third acquisition module 601 is configured to acquire a first image to be authenticated and a second image to be authenticated.

The first image to be authenticated and the second image to be authenticated are required to be judged whether to be two face images of the same face or not.

The extraction module 602 is configured to extract Gabor features and POEM features of the first image to be authenticated and the second image to be authenticated according to the type parameters, position parameters, dimension parameters and direction parameters of the features of the face classifier respectively.

The Gabor feature and POEM feature of the first image to be authenticated are extracted, the Gabor feature and POEM feature of the second image to be authenticated are extracted, and the feature extraction method has been introduced in the abovementioned embodiment of the disclosure in detail, and will not be elaborated herein.

The calculation module 603 is configured to calculate an inner product of the Gabor features of the first image to be authenticated and the second image to be authenticated and a Chi-Square distance of the POEM features according to the Gabor feature and POEM features of the first image to be authenticated and the second image to be authenticated.

For example, a Gabor feature vector of the first image to be authenticated is $C^A$, a Gabor feature vector of the second image to be authenticated is $C^B$, the inner product of the Gabor feature vectors of the first image to be authenticated and the second image to be authenticated is calculated, and a calculation method is as follows:

$$Sim(C^A, C^B) = \sum_{i=1}^{8} C_i^A * C_i^B.$$

A calculation method for calculating the Chi-Square distance of the histograms of the POEM features of the first image to be authenticated and the second image to be authenticated is as follows:

$$Dis(p_1, p_2) = \sum_i \frac{(p_1^i - p_2^i)^2}{p_1^i + p_2^i},$$

where Dis represents the Chi-Square distance of the two histograms $p_1$ and $p_2$.

The judgment module 604 is configured to judge the calculated inner product and Chi-Square distance to judge whether the first image to be authenticated and the second image to be authenticated are face images of the same person or not by the face classifier through the threshold parameter and the weight parameters.

For the judgment module 604 to judge whether the first image to be authenticated and the second image to be authenticated are the face images of the same person or not, it is necessary to cascade the weak classifiers and the strong classifiers.

The cascaded classifiers include multiple strong classifiers, each level of strong classifier includes multiple weak classifiers, $h_t$ represents a weak classifier, then a first vector which is the inner product of the two Gabor feature vectors and a second vector which is the Chi-Square distance of the histograms of the two POEM features are compared with a threshold parameter of the corresponding weak classifier $h_t$, it is determined that the first and second vectors pass verification of the weak classifier if a requirement of the threshold parameter is met, a verification result is 1, and if the first and second vectors do not pass verification of the weak classifier, the verification result is 0.

Similarly, a judgment method for the second vector is the same as that for the first vector, and will not be elaborated herein.

Under the strong classifier of a certain level, the weights are accumulated according to judgment results of threshold parameters of the weak classifiers, the weights of the weak classifiers are accumulated if verification of the weak classifiers succeeds, otherwise the weights are not accumulated.

After judgment and weight accumulation of the weak classifiers, the accumulated weights are compared with the threshold parameters of the strong classifiers to which the weak classifiers belong, and similarly, if accumulated weight values are more than the threshold parameters of the strong classifiers, it is determined that verification of the strong classifiers succeeds, and if the accumulated weight values are smaller than the threshold parameters of the strong classifiers, it is determined that verification of the strong classifiers fail.

After verification of the strong classifiers of the previous levels succeeds, the strong classifiers of the next levels perform judgment until verification of all the strong classifiers succeeds, and if verification of all the strong classifiers succeeds, it is determined that the first image to be authenticated and the second image to be authenticated are the face images of the same person.

According to the disclosure, the Gabor features and POEM features of the training images are screened by the cascading AdaBoost algorithm, robustness of the Gabor features to light is utilized, and feature extraction and authentication speed may also be greatly increased.

From the above, it can be seen that the disclosure achieves the following technical effects:

1: the Gabor features and POEM features are extracted from the multiple face training images, for the Gabor features, the Gabor features are determined at different distances on the face images according to different dimensions, and for the POEM features, blocks at different positions and with different sizes are traversed on the face images, and the selected POEM features enrich a structuring manners of the POEM features; the Gabor features and the POEM features are trained by the AdaBoost algorithm, and during authentication, only the selected features are extracted; and 2: the two kinds of features are simultaneously selected by the AdaBoost algorithm, and low-correlation features are selected, so that the number of the selected features is greatly reduced, and feature extraction speed is increased.

In addition, when face recognition is performed on a Feret database according to the features obtained by fusing the two kinds of features, the false recognition rate on fa, fb and dup1 is 0.001, and the recognition rates are 0.971, 0.985 and 0.751 respectively; when the false recognition rate of face recognition only with the Gabor features is 0.001, the recognition rates are 0.962, 0.969 and 0.698 respectively; and when the false recognition rate of face recognition only with the POEM features is 0.001, the recognition rates are 0.967, 0.974 and 0.719 respectively. Therefore, the recognition rate of face recognition with the two kinds of features which are fused is higher than the recognition rate of face recognition with any one of the two kinds of features.

The above is only the preferred embodiment of the disclosure and not intended to limit the disclosure, and for those skilled in the art, the disclosure may have various modifications and variations. Any modifications, equivalent replacements, improvements and the like made within the spirit and principle of the disclosure shall fall within the scope of protection of the disclosure.

What is claimed is:
1. A face authentication method, comprising:
   acquiring multiple face training images;
   extracting Gabor features of the multiple face training images;
   extracting Pattern of Oriented Edge Magnitude(POEM) features of the multiple face training images;
   fusing the Gabor features of the multiple face training image and the POEM features of the multiple face training image to acquire positive samples and negative samples of the multiple face training images, wherein the positive samples are pairwise combinations of different face images of the same person in the multiple face training images, and the negative samples are pairwise combinations of face images of different persons in the multiple face training images;
   training the positive samples and negative samples of the multiple face training images to obtain training results by an AdaBoost algorithm; and
   performing face authentication by the training results, wherein training the positive samples and negative samples of the multiple face training images to obtain the training results by the AdaBoost algorithm comprises: forming a face classifier by training of the AdaBoost algorithm, the face classifier comprising multiple levels of strong classifiers and weak classifiers forming each level of strong classifier in the multiple levels of strong classifiers, the weak classifiers consisting of the Gabor features and the POEM features, the weak classifiers comprising type parameters, position parameters, dimension parameters and direction parameters of the features, as well as threshold parameters and weight parameters which are determined according to a set goal of the face recognition rate, and the threshold parameters being configured to determine the face authentication results.

2. The face authentication method according to claim 1, wherein extracting the POEM features of the multiple face training images comprises:
   performing POEM code calculation on the multiple face training images;
   acquiring multiple rectangles of different sizes and different positions;
   traversing each face in the multiple face training images subjected to POEM code calculation to obtain histograms of POEM codes in the rectangles according to the multiple rectangles; and
   determining the histograms as the POEM features.

3. The face authentication method according to claim 1, wherein fusing the Gabor features of the multiple face training images and the POEM features of the multiple face training images to acquire the positive samples and negative samples of the multiple face training images comprises:
   for the Gabor features of the multiple face training images, calculating inner products of feature vectors of Gabor feature points corresponding to every two face training images in the multiple face training images to obtain first vectors;
   for the POEM features of the multiple face training images, calculating Chi-Square distances of histograms of the POEM features corresponding to every two face training images in the multiple face training images to obtain second vectors; and
   combining the first vectors and the second vectors to obtain the positive samples and negative samples of the multiple face training images.

4. The face authentication method according to claim 1, wherein training the positive samples and negative samples of the multiple face training images by the AdaBoost algorithm comprises:
   acquiring training targets of the AdaBoost algorithm, wherein the training targets comprises recognition rate and/or false recognition rate; and
   training the positive samples and negative samples of the multiple face training images by the training targets until the training targets are achieved.

5. The face authentication method according to claim 1, wherein performing face authentication by the training results comprises:
   acquiring a first image to be authenticated and a second image to be authenticated;
   extracting Gabor features and POEM features of the first image to be authenticated and the second image to be authenticated according to the type parameters, position parameters, dimension parameters and direction parameters of the features of the face classifier;
   calculating an inner product of the Gabor features of the first image to be authenticated and the second image to be authenticated and a Chi-Square distance of the POEM features according to the Gabor feature and POEM features of the first image to be authenticated; and the second image to be authenticated; and
   judging the calculated inner product and Chi-Square distance to judge whether the first image to be authenticated and the second image to be authenticated are face images of the same person or not by the face classifier through the threshold parameter and the weight parameters.

6. A face authentication device, comprising a processor configured to execute program units stored on a memory, the program units comprising:
   an acquisition unit, configured to acquire multiple face training images;
   a first extraction unit, configured to extract Gabor features of the multiple face training images;
   a second extraction unit, configured to extract Pattern of Oriented Edge Magnitude (POEM) features of the multiple face training images;
   a fusing unit, configured to fuse the Gabor features of the multiple face training image and the POEM features of the multiple face training image to acquire positive samples and negative samples of the multiple face training images, wherein the positive samples are pairwise combinations of different face images of the same person in the multiple face training images, and the negative samples are pairwise combinations of face images of different persons in the multiple face training images;
   a training unit, configured to train the positive samples and negative samples of the multiple face training images to obtain training results by an AdaBoost algorithm; and
   an authentication unit, configured to perform face authentication by the training results, wherein
   the training unit comprises: a forming module, configured to form a face classifier by training of the AdaBoost algorithm, the face classifier comprising multiple levels of strong classifiers and weak classifiers forming each level of strong classifier in the multiple levels of strong classifiers, the weak classifiers consisting of the Gabor features and the POEM features, the weak classifiers comprising type parameters, position parameters, dimension parameters and direction parameters of the features, as well as threshold parameters and weight parameters which are determined according to a set goal of the face recognition rate, and the threshold parameters being configured to determine the face authentication results.

7. The face authentication device according to claim 6, wherein the second extraction unit comprises:
   a coding module, configured to perform POEM code calculation on the multiple face training images;
   a first acquisition module, configured to acquire multiple rectangles of different sizes and different positions;
   a traversing module, configured to traverse each face in the multiple face training images subjected to POEM code calculation to obtain histograms of POEM codes in the rectangles according to the multiple rectangles; and
   a feature module, configured to determine the histograms as the POEM features.

8. The face authentication device according to claim 6, wherein the fusing unit comprises:

a first vector module, configured to, for the Gabor features of the multiple face training images, calculate inner products of feature vectors of Gabor feature points corresponding to every two face training images in the multiple face training images to obtain first vectors;

a second vector module, configured to, for the POEM features of the multiple face training images, calculate Chi-Square distances of histograms of the POEM features corresponding to every two face training images in the multiple face training images to obtain second vectors; and a sample module, configured to combine the first vectors and the second vectors to obtain the positive samples and negative samples of the multiple face training images.

9. The face authentication device according to claim 6, wherein the training unit comprises:

a second acquisition module, configured to acquire training targets of the AdaBoost algorithm, wherein the training targets comprises recognition rate and/or false recognition rate; and a training module, configured to train the positive samples and negative samples of the multiple face training images by the training targets until the training targets are achieved.

10. The face authentication device according to claim 6, wherein the authentication unit comprises:

a third acquisition module, configured to acquire a first image to be authenticated and a second image to be authenticated;

an extraction module, configured to extract Gabor features and POEM features of the first image to be authenticated and the second image to be authenticated according to the type parameters, position parameters, dimension parameters and direction parameters of the features of the face classifier;

a calculation module, configured to calculate an inner product of the Gabor features of the first image to be authenticated and the second image to be authenticated and a Chi-Square distance of the POEM features according to the Gabor feature and POEM features of the first image to be authenticated and the second image to be authenticated; and a judgment module, configured to judge the calculated inner product and Chi-Square distance to judge whether the first image to be authenticated and the second image to be authenticated are face images of the same person or not by the face classifier through the threshold parameter and the weight parameters.

* * * * *